United States Patent [19]

Okaue et al.

[11] Patent Number: 5,015,086
[45] Date of Patent: May 14, 1991

[54] ELECTRONIC SUNGLASSES

[75] Inventors: Etsuo Okaue; Masaru Egawa; Yoshihiko Kasai; Norio Horaguchi, all of Suwa, Japan

[73] Assignee: Seiko Epson Corporation, Tokyo, Japan

[21] Appl. No.: 509,450

[22] Filed: Apr. 16, 1990

Related U.S. Application Data

[63] Continuation-in-part of Ser. No. 346,497, May 2, 1989, abandoned.

[30] Foreign Application Priority Data

| Apr. 17, 1989 | [JP] | Japan | 1-44807[U] |
| Apr. 17, 1989 | [JP] | Japan | 1-44810[U] |
| May 31, 1989 | [JP] | Japan | 1-63374[U] |

[51] Int. Cl.$^5$ ................................ G02C 7/10
[52] U.S. Cl. .................... 351/44; 350/331 R
[58] Field of Search ............ 351/41, 44, 158; 350/331 R, 334

[56] References Cited

U.S. PATENT DOCUMENTS 4,279,474  7/1981  Belgorod ............... 351/44
4,968,127  11/1990  Russell et al. .......... 351/44

Primary Examiner—Paul M. Dzierzynski
Attorney, Agent, or Firm—Blum Kaplan

[57] ABSTRACT

Electronic sunglasses of the transmittance-varying type including liquid crystal panels employing the electro-optical effect and a solar cell used as a power source. The electronic sunglasses include a voltage detecting circuit having such a hysteresis characteristic so as to output a signal for changing transmittance of the liquid crystal panel from a high mode to a low mode at at least high predetermined voltage or illumination, and changing transmittance from a low mode to a high mode at at least a low voltage or illumination. The sunglasses also include a first switch which operates at at least two switch positions, one switch position having a first stage of illumination at less than 20,000 Lux and a second stage of illumination at 20,000 Lux or greater at which transmittance is changed from a high mode and another switch position disabling the voltage detecting circuit. Also included is a second switch which operates to change transmittance from a high mode to a low mode independently of the set voltage value in the voltage detecting circuit according to the hysteresis effect.

6 Claims, 3 Drawing Sheets

ELECTRONIC SUNGLASSES

CROSS-REFERENCE TO RELATED APPLICATION

This application is a continuation-in-part application of U.S. patent application Ser. No. 07/346,497, filed May 2, 1989 now abandoned.

BACKGROUND OF THE INVENTION

The present invention relates generally to electronic sunglasses, and, in particular, to transmittance-varying sunglasses which employ the electro-optical effect of a liquid crystal material and a solar cell which serves both as a power source for driving the liquid crystal and as a sensor for detecting the quantity of ambient light.

The provision of transmittance-varying sunglasses using a liquid crystal material has been proposed in various publications. The general concept has been illustrated in, for example, in FIG. 1 of Japanese Patent First Publication No. Showa 48-98846, FIG. 3 of Japanese Patent First Publication No. Showa 51-124936, FIG. 1 of Japanese Utility Model First Publication No. Showa 62-127524, FIGS. 5 and 7 of Japanese Patent First Publication No. Showa 62-40425, FIG. 1 of Japanese Utility Model First Publication No. Showa 55-95106, FIG. 1 of Japanese Utility Model First Publication No. Showa 59-178618, and FIG. 1 of Japanese Utility Model First Publication No. Showa 62-109137. As has been understood from these examples, such electronic sunglasses are composed of a liquid crystal panel serving as a transmittance-varying section, a power source, a driving circuit, a control circuit, and an optical detecting section. However, these prior art constructions have proved less than completely satisfactory for the following reasons.

Considering transmittance-varying sunglasses employing the electro-optical effect of liquid crystal and using a solar cell as a power source, the prior art sunglasses include a circuit for detecting an electromotive force of the solar cell and switching the transmittance mode according to the amount of ambient light. In the case where the operating illumination of the liquid crystal panel is the same as the stopping illumination, the received illumination is often varied according to the changing orientation of a user and obstacles which screen the light from the sun rays, resulting in frequent switching of the liquid crystal panel from an operation mode to a stop mode or vice versa and varying transmittance of a lens. This frequent variation is a great annoyance to a user.

It is very important to set an illumination at which transmittance is varied. Hence, unless the illumination is properly set, the change of transmittance is not performed in a preferable illumination, resulting in annoyance to a user. To set the illumination properly, the prior art devices provide a means for varying the resistance value in a circuit, which makes it possible to set an illumination. Yet, it is very troublesome to arrange a variable resistor according to the environment in which the sunglasses are used. No constructions have been proposed for setting a user-friendly illumination at which transmittance is changed. Further, in the case of setting a proper illumination, in some conditions, it may be desirous to make transmittance lower below the set illumination to change the transmittance from a high mode to a low mode or to make transmittance higher over the set illumination to change the transmittance from a low mode to a high mode. This means that it is insufficient to provide the change of transmittance at the two stages of a high mode to a low mode or vice versa of the received illumination. This is a relevant shortcoming to be overcome.

Except for the system for switching the liquid crystal panel on or off at the set illumination as mentioned above, there have been other systems for arranging transmittance by continuously changing a voltage applied to the liquid crystal panel according to the quantity of outside light and for arranging transmittance by changing a ratio of an on time to an off time during one period of a pulse to be applied to the liquid crystal according to the quantity of outside light. These systems, however, are not effective in some conditions. For example, an uneven density appears on the liquid crystal panel by changing dependency on a view point based on the change of a voltage applied to the liquid crystal. When, for example, a user drives through the woods by car, that is, the quantity of ambient light is abruptly and frequently changed, the transmittance is frequently changed. This frequent change is a great annoyance to the user.

Accordingly, it is desired to provide electronic sunglasses which are capable of preventing frequent change of transmittance, allowing proper setting of the set illumination according to the situation with one touch, and changing transmittance according to a user's will.

SUMMARY OF THE INVENTION

Generally speaking, in accordance with the present invention, electronic sunglasses of the transmittance-varying type including liquid crystal panels employing the electro-optical effect and a solar cell used as a power source, are provided. The electronic sunglasses include a voltage detecting circuit having such a hysteresis characteristic so as to output a signal for changing transmittance of the liquid crystal panel from a high mode to a low mode at at least a high predetermined voltage or illumination, and changing transmittance from a low mode to a high mode at at least a low voltage or illumination. The sunglasses also include a first switch which operates at at least two switch positions, one switch position having a first stage of illumination at less than 20,000 Lux and a second stage of illumination at 20,000 Lux or greater at which transmittance is changed from a high mode to a low mode and another switch position disabling the voltage detecting circuit. Further, the sunglasses include a second switch which operates to change transmittance from a high mode to a low mode independently of the set voltage value in the voltage detecting circuit according to the hysteresis effect.

Accordingly, it is an object of the present invention to provide improved electronic sunglasses.

Another object of the present invention is to provide electronic sunglasses which are capable of preventing frequent change of transmittance.

A further object of the present invention is to provide electronic sunglasses which permit proper setting of the set illumination in a simple fashion.

Yet another object of the present invention is to provide electronic sunglasses in which transmittance can be changed according to a user's desire.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
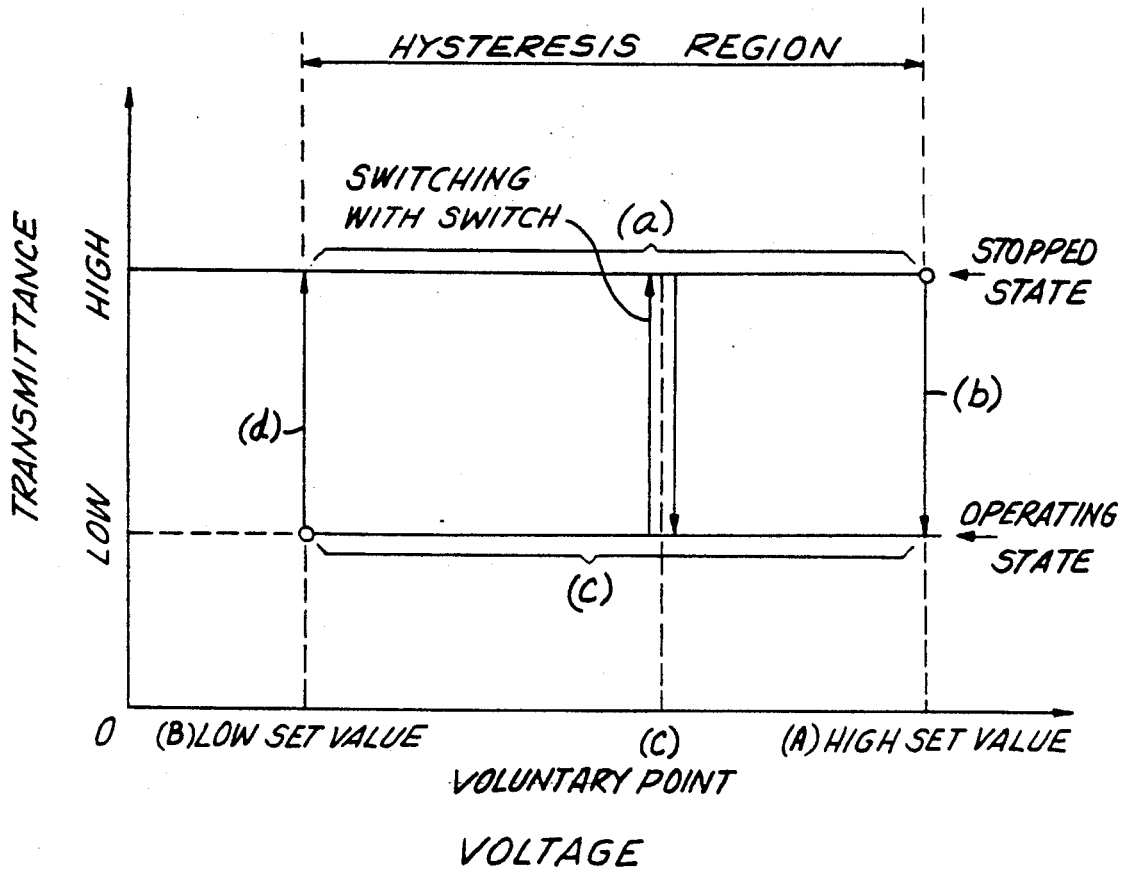
FIG. 1 is a graph showing the relationship between transmittance and illumination in electronic sunglasses constructed in accordance with the present invention.

When determining the difference between illumination at which transmittance is switched on and illumination at which transmittance is switched off, there is employed a system for dividing a voltage of a solar cell, detecting a voltage set by a voltage detecting circuit, and driving the liquid crystal thereby. Such system may be used with a system which includes a capacitor connected with the voltage detecting section of the voltage detecting circuit in parallel for delaying the transmittance from a low mode to a high mode on time and taking a difference between the illuminations at which transmittance is varied, as well as a system for making the operating voltage of the voltage detecting circuit hysteretic.

For defining a proper illumination at which transmittance is changed from a high mode to a low mode, the illumination is measured and the way of use is researched in several locations as set forth in Table 1 below.

TABLE 1

| PLACE | WEATHER | ILLUMINATION |
| --- | --- | --- |
| Inside of Automobile | Clear | 6,000 Lux |
| Inside of Automobile | Cloudy | 1,000 Lux |
| Inside of Tunnel | | 50 Lux |
| Inside of Automobile | Clear (direct sun) | 15,000 Lux |
| Skiing Ground | Clear | 80,000 Lux |
| Skiing Ground | Cloudy | 15,000 Lux |
| Lift Stop | Clear | 5,000 Lux |
| Lift Stop | Cloudy | 8,000 Lux |

The foregoing researched results indicate that the using condition in a car is quite different from the condition on a skiing ground so that the single illumination does not conform to any one place. The table also indicates that the proper illumination at which transmittance is changed from a high mode to a low mode is less than 20,000 Lux in driving a car and 20,000 Lux or more in the skiing ground. In case the user is looking out of the car window in driving a car, the transmittance has to be changed at a relatively low illumination. In case of setting high illumination, the transmittance is not changed in a glaring place. On the other hand, in case of setting a low illumination on the skiing ground, the irregular reflection of sun rays on snow serves to change transmittance even on a cloudy day. For achieving convenient and practical electronic sunglasses, the set illumination is required to change in any used places.

The present invention may provide an additional switch for disabling the switching circuit. For example, when the user drives a car through woods or through a city, that is, where illumination is abruptly changed, the difference of illumination between a shady spot and a sunny spot is quite large. This results in causing the sunglasses to switch on and off. This would be quite annoying to a user. In such places, it is convenient for a user to disable the switching circuit as desired.

The illumination at which transmittance is changed from a low mode to a high mode should be preferably 6,000 Lux or less. If the illumination at which transmittance is changed from a low mode to a high mode is 6,000 Lux or less, the difference between the on illumination and the off illumination becomes quite sufficient, thereby causing a time lag about the change of transmittance. Hence, the frequent change of transmittance is prevented in the spot at which illumination is changed instantly. The change of the set illumination can be easily realized by the change of a resistance value in the circuit.

The switch for changing transmittance from a high mode to a low mode or vice versa irrespective of the set voltage value in the hysteresis area can be realized by a switch for short-circuiting or opening a resistance which serves to divide a voltage in the voltage detecting circuit.

In case of setting a voltage value for detecting the operation of the liquid crystal panel at a high mode, setting a voltage for detecting the stop thereof at a low mode, and using the solar cell output for a sensor, the illumination at which the liquid crystal panel is operated is made higher and the illumination at which it is stopped is made lower.

The difference between the operating illumination and the stopping illumination brings about no change of the liquid crystal panel against the small change of illumination based on the orientation of a user when the sunglasses are operated. Hence, the illumination is not kept switched on and off, resulting in being an annoyance to a user. Like the stopping case, the difference between the operating illumination and the stopping illumination brings about no annoying on-and-off switching of illumination.

FIG. 1 shows the operation-stopping state of electronic sunglasses according to the present invention. The liquid crystal panel is operated at the high illumination value (b), then changing transmittance from a high mode to a low mode. Next, in case of reducing the quantity of outside light, the low transmittance is kept to the lower illumination value (a). When the illumination reaches the low value, the transmittance is changed from a low mode to a high mode. That is, the orientation of illumination change depends on the path of transmittance, resulting in giving a hysteresis characteristic.

As shown in FIG. 1, there exist high and low transmittances at a given illumination. By providing a switch for switching a voltage applied to the voltage detecting circuit (c), the voltage which is higher than the high set voltage value or lower than the low set voltage value is forcibly applied, thereby the transmittance is changed to a lower or higher state.

In FIG. 1, a point where the transmittance of the liquid crystal panel is high shows the case where the liquid crystal panel is in the standing condition and the transmittance from the outside is large. On the other hand, a point where the transmittance is low shows the case where the liquid crystal panel is in the working condition and the transmittance from the outside is small. If an illumination from the outside increases more than a high set value (b) when the liquid crystal panel is in the standing condition, the condition switches to the working condition from the standing condition. If the illumination from outside decreases lower than a low set value (a) when the liquid crystal panel is in the working condition, the condition switches to the standing condition from the working condition.

As discussed above, in the electronic sunglasses according to the present invention, the high set voltage (b) for turning the liquid crystal panel from the standing condition to the working condition is differentiated from the low set voltage (a) for switching from the working condition to the standing condition, thereby actuating the liquid crystal panel by a hysteresis characteristic by means of the passes between (a) and (b) of FIG. 1. By actuating the liquid crystal panel by the hysteresis characteristic, it is possible to obtain the stable working condition and standing condition without any reaction with a movement of the user's line of sight and a little variation of the solar rays.

Further, when the illumination from outside belongs to an environmental illumination, which is the voltage between (a) and (b), the voltage whose value is more than high set voltage (b) or whose value is less than low set voltage (a) is applied to the liquid crystal panel by force, thereby switching the liquid crystal panel from the standing condition to the working condition when the value is higher than the high set value, and, switching from the working condition to the standing condition by force when the value is lower than the low set value. As described above, the condition of the liquid crystal panel is switched by force in addition to the basic mode, thereby providing improved electronic sunglasses in which it is possible to exhibit the advantageous feature of sunglasses even in the case where the illumination from outside varies greatly.

Hereinafter, the detailed description will be directed to embodiments of the present invention. It is noted, however, that the present invention is not limited to these embodiments.

EMBODIMENT 1

Figure 2:
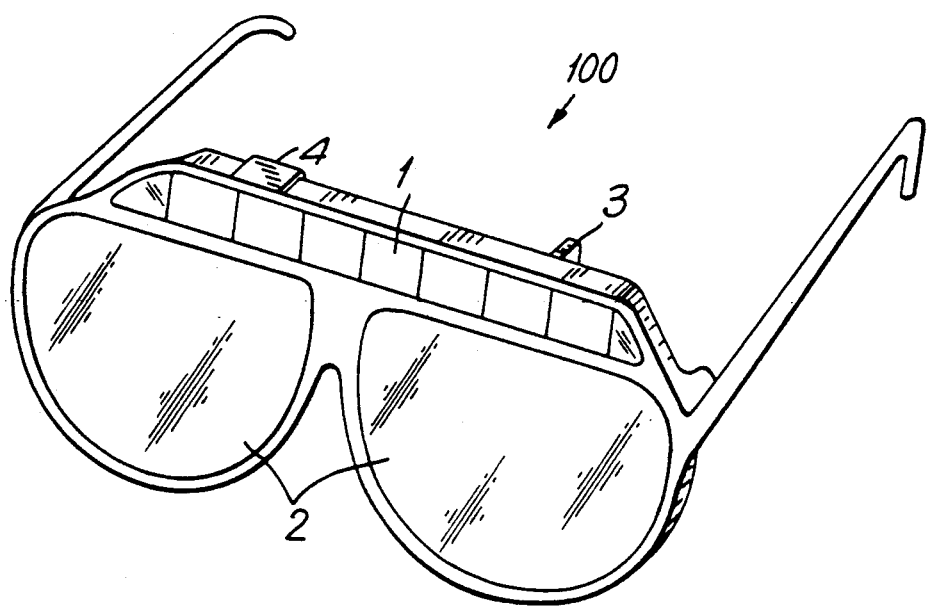
FIG. 2 is a perspective view of a pair of electronic sunglasses constructed in accordance with the present invention.

FIG. 2 is a view showing the outer appearance of a first embodiment of the invention. Electronic sunglasses, generally indicated at 100, include a solar cell 1, right and left lenses 2 with a liquid crystal cell, a switch 3 for switching a set illumination, and a touch switch 4 for forcibly switching the illumination on.

Figure 3:
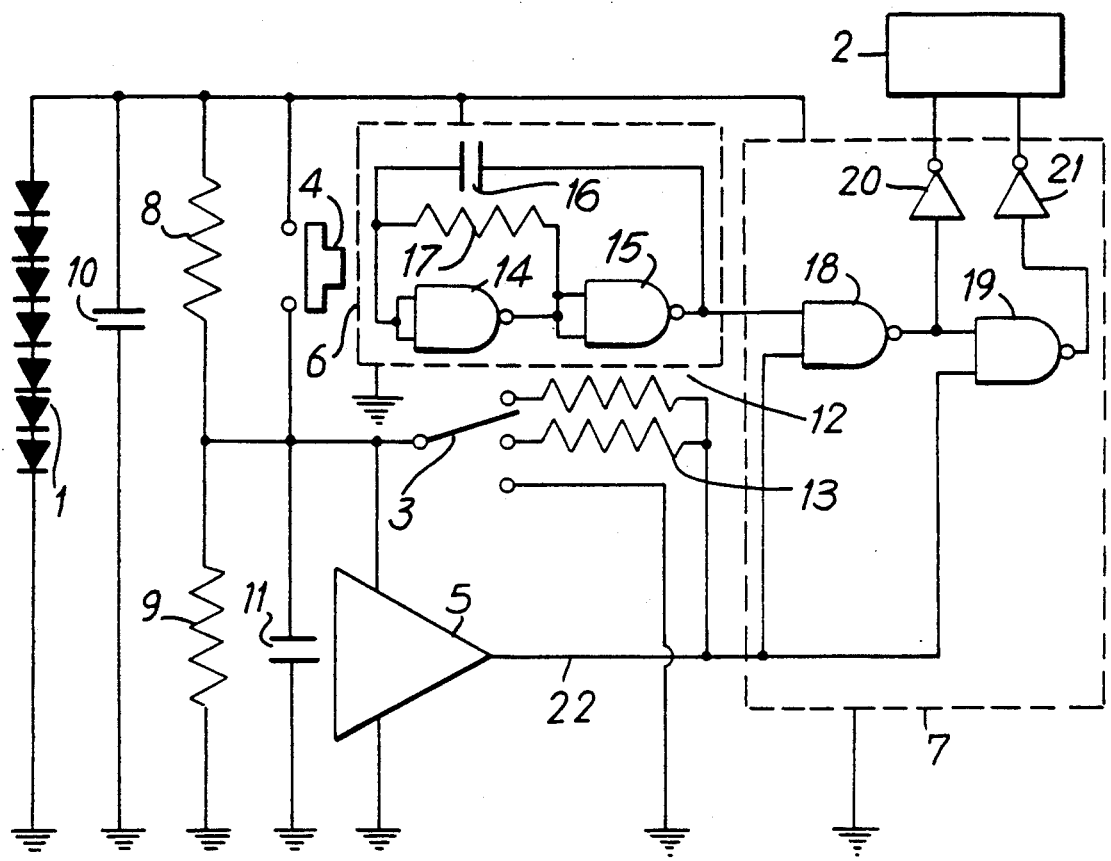
FIG. 3 is a schematic circuit diagram showing the circuitry employed in a pair of electronic sunglasses according to an embodiment of the present invention.

FIG. 3 is a circuit diagram showing the circuitry used in this embodiment. The circuit includes solar cell 1, lens 2 with a liquid crystal cell, a set illumination-switching switch 3, a touch switch 4, a voltage detecting circuit 5, an oscillating circuit 6, a liquid crystal driving circuit 7, voltage detecting resistors 8 and 9, a power source protective capacitor 10, a capacitor 11 for delaying the timing of switching transmittance, and resistors 12 and 13 for giving hysteresis to the operating voltage of the voltage detecting circuit.

The oscillating circuit 6 is a CR oscillating circuit and includes NAND gates 14, 15, a capacitor 16, and a resistor 17. Liquid crystal driving circuit 7 includes NAND gates 18, 19 for controlling an output and inverters 20 and 21. The construction of voltage detecting circuit is well-known and is not described here in detail. The power source protective capacitor 10 is coupled in parallel to the circuit.

The electromotive force of solar cell 1 is divided by resistor 8 and resistor 9 connected in parallel to voltage detecting circuit 5. The detecting level of the voltage detecting circuit 5 is set as about 3V. If the voltage applied to the voltage detecting resistor 9 does not attain a level of about 3V, an output signal 22 becomes an off signal (L) and an equi-phase (L) voltage is applied to the liquid cell 2, resulting in disabling the liquid crystal cell 2. When the applied voltage exceeds about 3V of the voltage detecting level, the output signal 22 of the voltage detecting circuit 5 becomes an on signal (H), thereby the reverse phase a.c. signal of the oscillating circuit is applied to the liquid crystal cell.

A driving frequency should be preferably several tens to several hundreds Hz defined by the resistor 17 and the capacitor 16.

Since the resistors 12 and 13 bring about a hysteresis state in the voltage detecting circuit, they are used for making a difference between illuminations at which transmittance is changed from a high mode to a low mode and vice versa. The resistor is switched by the switch 3, thereby changing the illumination at which transmittance is changed from a high mode to a low mode. Further, the switch 3 provides a stable spot for grounding the voltage detecting circuit for disabling the circuit.

The capacitor 11 serves to keep the circuit operated for a while even if the outside illumination is changed from a high mode to a low mode. This is effective in preventing the frequent change of transmittance of the lens, resulting in putting no annoyance to a user.

The power source protective capacitor 10 should be about several tens $\mu$, it is used for removing noises and ripples supplied to the power source.

The output of the solar cell is changed by the outside illumination as well as influenced by its outside mounted position. The present embodiment uses an amorphous silicon solar cell consisting of cell elements connected in series at the seven stages, the area of which is 0.8 cm$^2$. Since the output of the solar cell is influenced by its outside mounted position, in general, it is difficult to define the values of the voltage detecting resistors 8, 9 and the resistors 12, 13. The present embodiment defines the resistor 12 as 1M$\Omega$, the resistor 13 as 480 k$\Omega$, the voltage detecting resistors 8 and 9 respectively as 220 k$\Omega$ and 1M$\Omega$ in a manner to allow the circuit to operate when the outside illumination is 15,000 Lux or 40,000 Lux.

The liquid crystal panel is designed as follows. The liquid crystal panel comprises a film substrate made of a synthetic resin including an electrode surface made of an ITO film, which substrate is subject to orientation treatment and nematic liquid crystal having a proper amount of added right-spinning chirality material. An (refractive anisotropy) is 0.07g sealed to keep the distance 7$\mu$ between the substrates together with a gap agent being scattered. The rubbing direction of the opposite substrate forms an angle of 110°. Then, light-polarizing plates are pasted from both sides in a manner to allow the absorption axes of these plates to match to the rubbing direction of the substrate. The absorption axis of the front light-polarizing plate is built in a sunglass frame in a manner to allow the right eye of the axis to be in parallel to the left eye of the axis.

Since the liquid crystal panel obtained above is weak in strength and easily damaged in using the panel as the transmittance-varying section of the sunglasses, polycarbonate plates whose thickness is 0.5 mm are connected on both sides of the panel with an ultraviolet rays hardening type adhesive agent. On the non-adhesive outside surface of the polycarbonate plate is provided a hard coat layer for hardening.

The transmittance-varying section designed as mentioned above has a transmittance of 8.11% when a voltage is applied (5V static) and 35% when no voltage is applied.

The electronic sunglasses are designed by incorporating the above-mentioned lens section connected with the liquid crystal panel and circuit section into a frame.

Researching the on-off illumination as changing the outside illumination, for the on illumination, the illumination is 14800 Lux when the resistor 12 is switched on and it is 42,000 Lux when the resistor 13 is switched on. For the off illumination, the illumination is 2,500 Lux. And, in case of using the touch switch, the resistor 8 is short-circuited in a manner to allow the user to turn on the circuit at the off illumination or more.

EMBODIMENT 2

Figure 4:
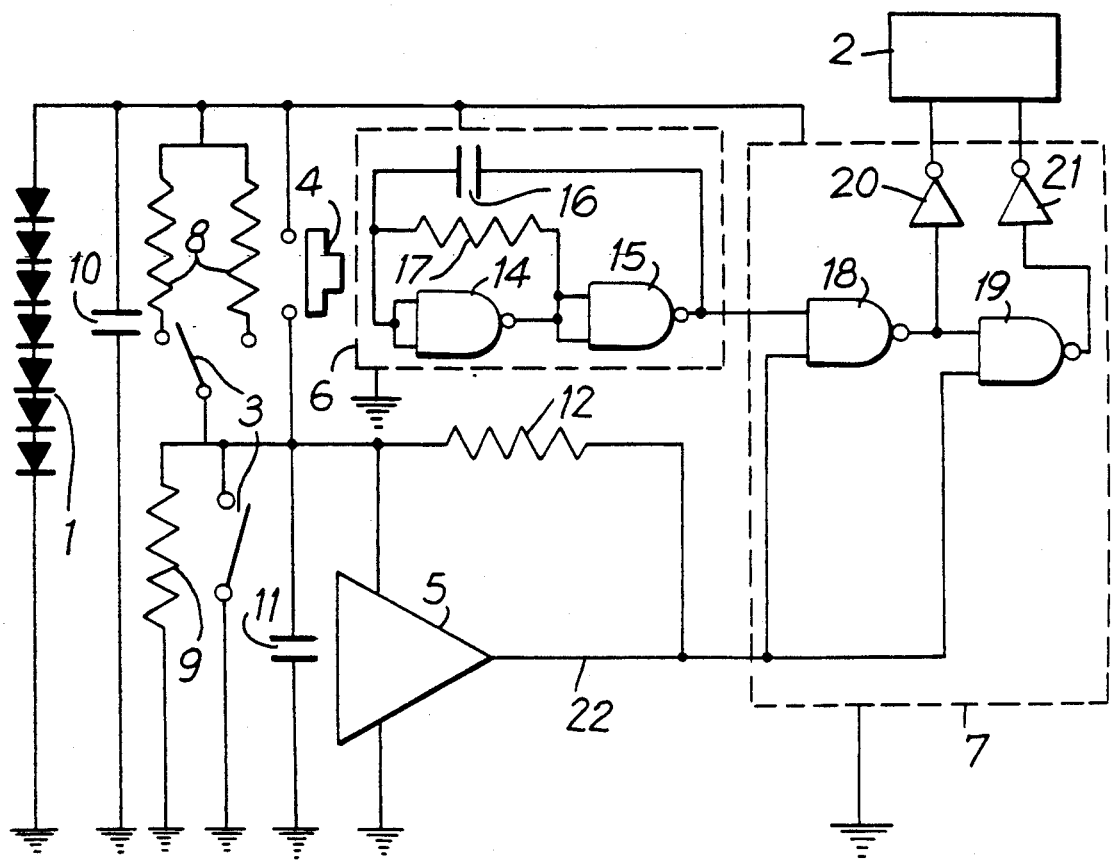
FIG. 4 is a schematic circuit diagram showing the circuitry used in a pair of electronic sunglasses according to an alternative embodiment of the present invention.

The second embodiment is designed to operate switching of an operating illumination by varying the resistor 8 in embodiment 1. This embodiment is basically the same as embodiment 1 except that the resistor 12 for giving hysteresis to the voltage detecting circuit is defined as 1MΩ and the resistor 8 can be selected from 150kΩ and 230kΩ. FIG. 4 shows the circuit diagram of embodiment 2. Like elements from FIG. 3 are numbered alike.

Researching the on-off illumination as changing the quantity of outside light, when the resistor 8 is defined as 150kΩ, the transmittance is changed from a high mode to a low mode at 10,000 Lux and from a low mode to a high mode at 5,000 Lux. When the resistor 8 is defined as 230kΩ, these changes are done at 30,000 Lux and 6,000 Lux, respectively.

EMBODIMENT 3

This embodiment employs a lens made of diethylene glycol visallyl carbonate resin in place of a flat polycarbonate plate whose thickness is 0.5 mm. It is denoted as a transmittance-varying section contained in a lens. The lens is produced by a thermal polymerization method. The lenses are pasted on an objective side and an eye side of the liquid crystal panel, thereby providing the degrees as a whole. The lens pasted on the objective side has a convex curvature radius of 13 cm, an indefinite concave curvature radius (that is, plane), and a central thickness of 5 mm. The lens connected on the eye side has an indefinite convex curvature radius, a convex curvature diameter of 10 cm, and a central thickness of 1 mm. The degrees of the transmittance-varying section designed as mentioned above were measured as −1,14 diopters.

Like embodiment 1, this transmittance-varying section and the circuit are incorporated in a frame, resulting in a pair of sunglasses.

As mentioned above, according to the present invention, the set illumination is changed with one touch according to the circumstances under which the sunglasses are used. The illumination is switched on and off by the high set voltage and the low set voltage so as to make the circuit hysteretic. The invention provides a switch for forcibly changing the transmittance in the range, resulting in providing no disgusting repetition of changing the transmittance from a high mode to a low mode or vice versa. Hence, the change of transmittance is performed according to a user's demand. Further it goes without saying that the present invention may be applied to not only electronic sunglasses but also to an electronic sunvisor and to an electronic shield of a motorcycle, for example.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. Electronic sunglasses of the transmittance-varying type including liquid crystal panels employing the electro-optical effect and a solar cell used as a power source, comprising voltage detecting means having such a hysteresis characteristic so as to output a signal for changing transmittance of the liquid crystal panels from a high mode to a low mode at at least a high predetermined voltage or illumination, and changing transmittance from a low mode to a high mode at at least a low voltage or illumination, first switch means operating at at least two switch positions, one said switch position having a first stage or illumination at less than 20,000 Lux and a second stage or illumination at 20,000 Lux or greater at which transmittance is changed from a high mode to a low mode and another switch position disabling said voltage detecting means, and second switch means operating to change transmittance from a high mode to a low mode independently of the set voltage value of the voltage detecting means according to the hysteresis effect.

2. The electronic sunglasses as claimed in claim 1, wherein said electronic sunglasses include a frame supporting a right liquid crystal panel for the right eye and a left liquid crystal panel for the left eye.

3. The electronic sunglasses as claimed in claim 2, wherein said solar cell is supported on said frame.

4. The electronic sunglasses as claimed in claim 1, wherein said voltage detecting means includes delay means for delaying the change from a high mode to a low mode when the outside illumination is changed.

5. The electronic sunglasses as claimed in claim 1, wherein said liquid crystal panels include a film substrate made of a synthetic resin including an electrode surface made of an ITO film.

6. The electronic sunglasses as claimed in claim 5, wherein said film substrate is subject to orientation treatment and a nematic liquid crystal material having a proper amount of added right-spinning chirality material is provided.

* * * * *